United States Patent
Willis et al.

(10) Patent No.: US 9,804,281 B2
(45) Date of Patent: Oct. 31, 2017

(54) MIGRATION VELOCITY ANALYSIS METHOD FOR VSP DATA

(71) Applicant: Halliburton Energy Services, Inc.

(72) Inventors: Mark E. Willis, Katy, TX (US); Yue Du, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 124 days.

(21) Appl. No.: 14/651,909

(22) PCT Filed: Feb. 28, 2014

(86) PCT No.: PCT/US2014/019584
§ 371 (c)(1),
(2) Date: Jun. 12, 2015

(87) PCT Pub. No.: WO2014/149561
PCT Pub. Date: Sep. 25, 2014

(65) Prior Publication Data
US 2015/0316671 A1    Nov. 5, 2015

Related U.S. Application Data

(60) Provisional application No. 61/804,552, filed on Mar. 22, 2013, provisional application No. 61/869,168, filed on Aug. 23, 2013.

(51) Int. Cl.
*G01V 1/30* (2006.01)
(52) U.S. Cl.
CPC ........ *G01V 1/303* (2013.01); *G01V 2210/161* (2013.01); *G01V 2210/51* (2013.01)

(58) Field of Classification Search
CPC ............... G01V 1/303; G01V 2210/51; G01V 2210/161
USPC .................................. 367/14, 25, 73; 702/18
See application file for complete search history.

(56) References Cited

U.S. PATENT DOCUMENTS

| | | | |
|---|---|---|---|
| 4,802,146 A | 1/1989 | Moeckel | |
| 6,002,642 A | 12/1999 | Krebs | |
| 6,967,898 B2 | 11/2005 | Leaney | |
| 7,359,284 B2 | 4/2008 | Fuller et al. | |
| 7,911,878 B2 | 3/2011 | Zhao et al. | |
| 2009/0234622 A1 | 9/2009 | Sengupta | |
| 2010/0101861 A1 | 4/2010 | Chang | |
| 2010/0118653 A1 | 5/2010 | He et al. | |
| 2012/0059633 A1 | 3/2012 | Dutta et al. | |

OTHER PUBLICATIONS

Kahn et al., "High Resolution Adaptively Steered Horizon Tracker," Istanbul International Geophysical Conference and Oil & Gas Exhibition, Istanbul, Turkey, Sep. 17-19, 2012, 4 pages.

(Continued)

*Primary Examiner* — Daniel L Murphy
(74) *Attorney, Agent, or Firm* — Benjamin Fite; Parker Justiss, P.C.

(57) ABSTRACT

Vertical Seismic Profile (VSP) analysis is a technique commonly used to conduct geophysical surveys of subterranean features. The processing of a VSP includes several steps, usually including a final step of depth migration. In order to properly process and image VSP data using depth migration, a velocity model of the subsurface must be known or derived. A variety of criteria can be used to ascertain whether the velocity used for migration is accurate.

17 Claims, 12 Drawing Sheets

(56) References Cited

OTHER PUBLICATIONS

Ariffin et al., "Seismic Tools for Reservoir Management," Oilfield Review, 1995, 60 pages.
Willis et al., "Shear Wave Source for VSP and Surface Seismic Exploration," Application Serial No. PCT/US2012/67176, filed Nov. 30, 2012, 19 pages.
Alistair R. Brown, 2011, Interpretation of Three-Dimensional Seismic Data, Seventh Edition: AAPG Memoir 42/SEG Investigations in Geophysics, No. 9, 18 pages.
Woodham et al., "Error analysis for the seismic PDA tracker," Geophysics, vol. 60, No. 5, Sep.-Oct. 1995, 6 pages.
Woodham et al., "3-D seismic tracking with probabilistic data association," Geophysics, vol. 60, No. 4, Jul.-Aug. 1995, 7 pages.
Brown, "The value of autotrackers," The Leading Edge, Jun. 2012, 2 pages.
Authorized Officer Commissioner, International Search Report—Written Opinion for PC/US2014/019584, filed Feb. 28, 2014; dated Jun. 10, 2014; 14 pages.

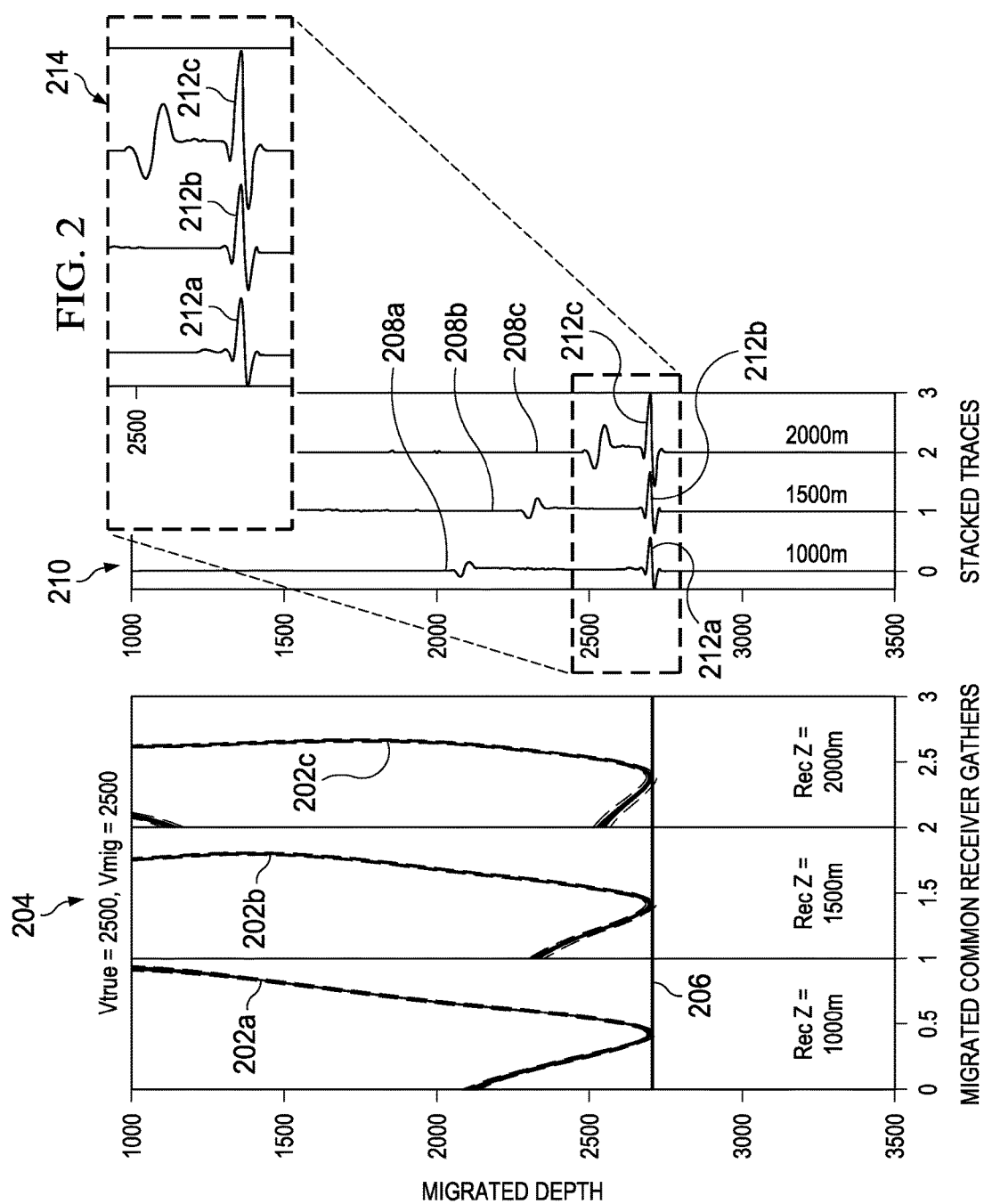

MIGRATION VELOCITY ANALYSIS METHOD FOR VSP DATA

CLAIM OF PRIORITY

This application is a U.S. National Stage of International Application No. PCT/US/2014/019584, filed Feb. 28, 2014, which claims priority to U.S. Provisional Application Ser. No. 61/804,552 filed Mar. 22, 2013 and U.S. Provisional Application Ser. No. 61/869,168 filed Aug. 23, 2013.

TECHNICAL FIELD

This disclosure relates to geophysical surveying using vertical seismic profile techniques.

BACKGROUND

Vertical Seismic Profile (VSP) analysis is a technique commonly used to conduct geophysical surveys of subterranean features. For instance, VSP analysis can be used to image the earth's subsurface in the proximity of a wellbore during the drilling or operation of a well. In an example implementation, one or more seismic energy sources are located at the surface and one or more seismic detectors are located within a wellbore. Information regarding the subsurface is determined based on the detection of reflected seismic energy that originates from the seismic energy sources at the surface.

The processing of a VSP includes several steps, usually including a final step of depth migration. In order to properly process and image VSP data using depth migration, a velocity model of the subsurface must be known or derived. A velocity model refers to the velocity of energy propagation across the examined subsurface.

DESCRIPTION OF DRAWINGS

FIG. 2 shows an example migration using an accurate migration velocity.

DETAILED DESCRIPTION

Figure 1A:
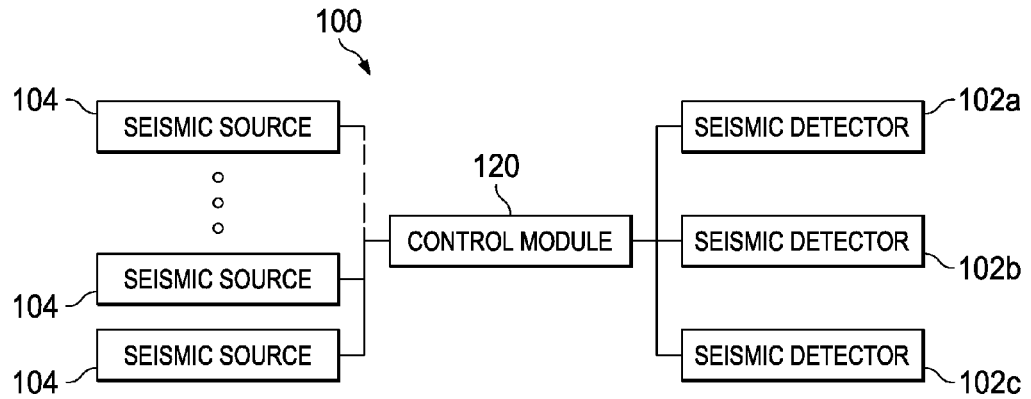
FIG. 1A is a schematic diagrams showing an exemplary system for performing VSP analysis of a subterranean region.

A vertical seismic profile (VSP) system can be used to analyze the earth's subsurface using VSP analysis. VSP systems can include one or more processing modules, one or more seismic sources, and one or more seismic detectors. Referring to FIG. 1A, an example VSP system 100 includes a processing module 120 communicatively connected to one or more seismic detectors (three detectors 102a-c are shown) and one or more seismic sources 104.

A seismic source 104 (also termed a "shot") is a device that generates controlled seismic energy and directs this energy into an underground formation. A seismic source 104 can generate seismic energy in a variety of ways, such as through an explosive device (e.g., dynamite or other explosive charge), an air gun, a plasma sound source, a "thumper truck," an electromagnetic pulse source, a seismic vibrator, or other devices that can generate seismic energy in a controlled manner. Seismic sources can provide single pulses of seismic energy or continuous sweeps of seismic energy.

A seismic detector 102 (also termed a "geophone") is a device used in seismic acquisition that detects ground velocity produced by seismic waves and transforms the motion into electrical impulses. Seismic detector 102 can detect motion in a variety of ways, for example through the use of an analog device (e.g., a spring-mounted magnetic mass moving within a wire coil) or a microelectromechanical (MEMS) device (e.g., a MEMS device that generates an electrical signal in response to ground motion) through an active feedback circuit.

A control module 120 is a device that communicates with seismic detectors 102 and seismic sources 104 in order to send and receive information from seismic detectors 102 and seismic sources 104, and to control the operation of seismic detectors 102 and seismic sources 104. While system 100 includes a single control module 120 for controlling both seismic sources 104 and seismic detectors 102a-c, in some implementations, more than one control module can be used to control some or all of seismic sources 104 and seismic detectors 102a-c, either independently or cooperatively.

Figure 1B:
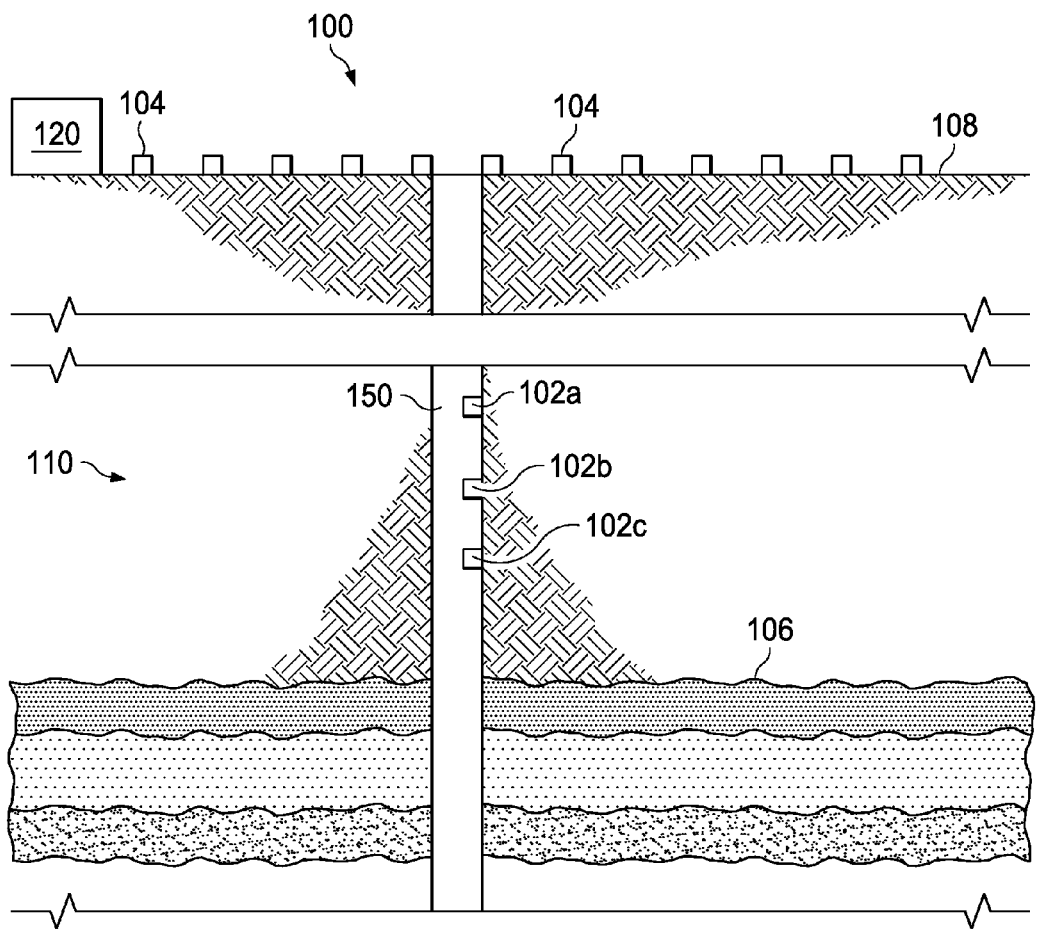
FIG. 1B shows an example physical arrangement of a VSP analysis system.

An example physical arrangement for VSP system 100 is shown in FIG. 1B. VSP system 100 includes three seismic detectors 102a-c, an array of seismic sources 104, and a control module 120. As shown, seismic sources 104 are positioned along the upper surface 108 of the subterranean volume 110, seismic detectors 102a-c are positioned along the upper surface 108 of the subterranean volume 110, seismic detectors 102a-c are positioned below upper surface 108 within a wellbore 150, and interface 106 is positioned below upper surface 108. Seismic sources 104 and seismic detectors 102a-c are communicatively connected to control module 120 through a communications interface (not shown). An example communications interfaces include, for example, wired connectors or wireless transceivers. Although not shown, in one or more embodiments, the seismic detectors 102a-c can be disposed in a tool or sonde conveyed into the wellbore 150 via a wireline, where the wireline controls the depth of the tool into the wellbore 150 and provides a channel for communication to the upper surface 108, e.g., to the control module 120.

Figure 1C:
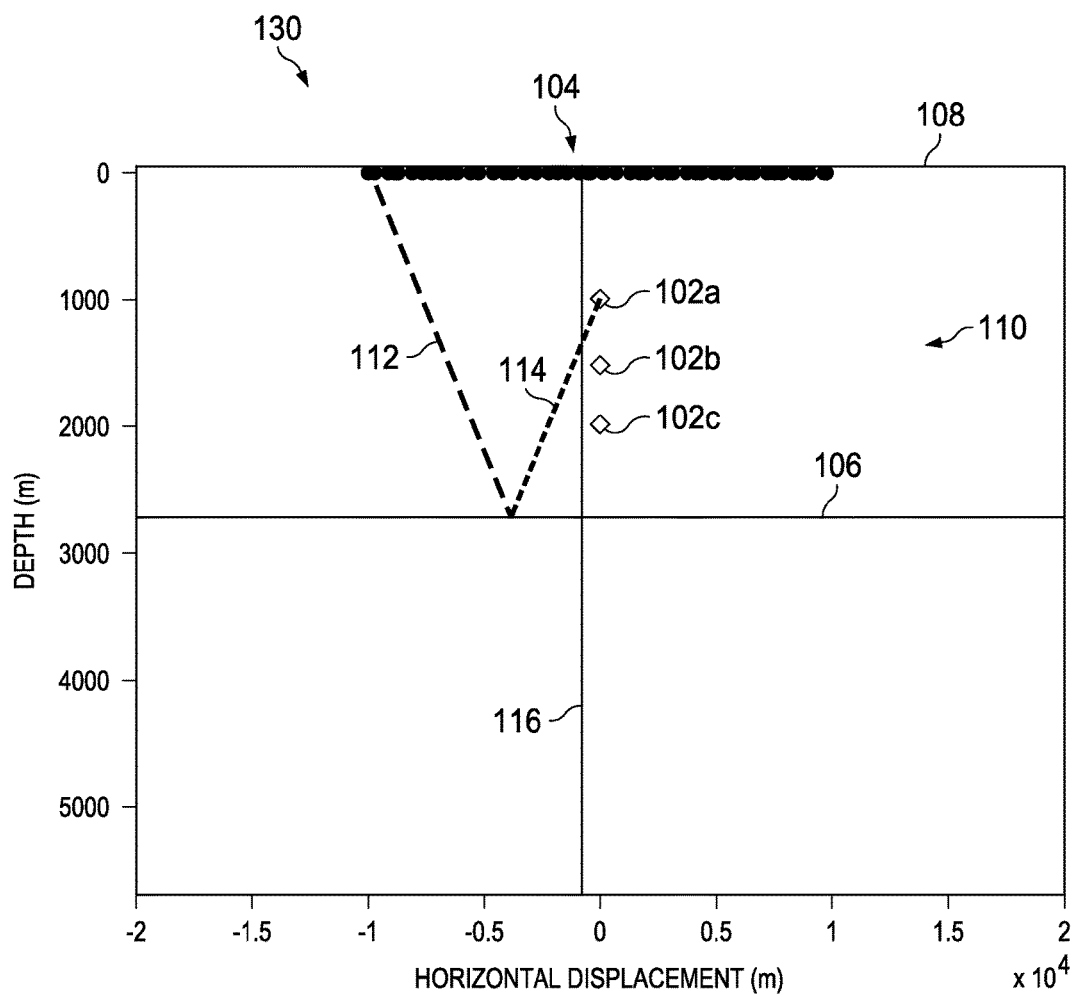
FIG. 1C is a plot showing an example VSP geometry for the system shown in FIGS. 1A-B.

While an example arrangement for VSP system 100 is shown in FIG. 1B, this example has not been drawn to scale. In general, components of VSP system 100 can be placed according to various physical geometries in order to analyze the subterranean volume. For instance, FIG. 1C shows an example VSP geometry 130 within a Cartesian coordinate system having a depth (in meters) on the vertical axis and horizontal displacement (in meters) on the horizontal axis. In VSP geometry 130 seismic sources 104 are positioned along the upper surface 108 of the subterranean volume 110, seismic detectors 102a-c are positioned at depths of 1000 m, 1500 m, and 2000 m below upper surface 108, respectively, and interface 106 is positioned at a depth of 2700 m below upper surface 108. It will be understood, however, that the seismic detectors 102a-c and interface 106 can be disposed at other depths or positions, either on the surface 108 or in a wellbore 150. In this example, the upper surface 108 of the subterranean volume 110 is on the uppermost surface of the earth. However, in some implementations, upper surface 108 may be below the earth's uppermost surface, e.g. on the sea floor, disposed below the overburden, or the like.

Control module 120 (not shown) can be placed independently from seismic detectors 102a-c and seismic sources 104. For example, control module 120 can be placed in proximity with one or more of seismic detectors 102a-c or seismic sources 104, or can be placed independently from other components of system 100.

During VSP analysis, seismic energy generated by the seismic sources 104 travels through the subterranean volume 110. Some of this energy is reflected and/or refracted by the features in subterranean volume 110 (e.g., reflected by the interface 106), and a portion of the reflected or refracted energy is recorded by the seismic detector 102a-c. For example, downward slanted line 112 shows the ray path of seismic energy traveling from the leftmost seismic source 104 down to the interface 106. The upward slanted line 114 shows the reflected energy back up to the uppermost seismic detector 102a. Time-dependent information (e.g., time-dependent seismic "traces") obtained from each of the seismic detector 102a-c can be "gathered" in order to determine information about the subterranean volume 110 and the interface 106. For instance, in the example geometry 130, the central vertical line 116 shows a position of one Common Image Gather (CIG) that can be extracted from the seismic traces.

The propagation of seismic energy through a medium is dependent on various factors. For example, in some implementations, the velocity of propagation can be dependent on the properties of the medium, such as the medium's density, elasticity, and depth below the surface. In some circumstances, subterranean volume 110 can be heterogeneous, and can include distributions of a variety of different media. Interface 106, for example, can be an interface between different media. Thus, seismic energy directed into subterranean volume 110 can propagate differently depending on the composition of subterranean volume 110.

In some implementations, the travel time (or "arrival time") of the seismic energy can also be dependent on the arrangement of the seismic sources, seismic detectors, and interfaces. In an example, seismic energy from a single seismic source 104 may have different travel times to each of the seismic detectors 102a-c, as each of the seismic detectors 102a-c are located at a different depth below upper surface 108. In another example, seismic energy from different seismic source 104 may have different travel times to each seismic detector 102a-c, as each seismic source 104 is located at a different point along the upper surface 108.

A process known as residual moveout analysis can be used to account for these differences. In an example implementation of residual movement analysis, seismic traces from each of the seismic detectors 102a-c can be "migrated" based on information about the known or predicted properties of subterranean volume 110. Migration is a process where each sample of an input trace is mapped to an output image according to an image point within the subsurface. For example, seismic traces can be migrated by applying a velocity model that describes the behavior of seismic energy through the subterranean volume 110 based on known or predicted information about the composition of subterranean volume 110. If the velocity model used for migration is accurate, when seismic traces are migrated, the resulting output traces will have reflection events that align properly, and a clear image of the subterranean volume can be created. However, if an inaccurate velocity is used, the events of the migrated output traces might not align, and the image might not be clear.

FIG. 2 shows an example migration of three sets of seismic traces 202a-c obtained from each of the seismic detectors 102a-c in the VSP geometry 100, respectively. In this example, seismic traces 202a-c have been migrated using a velocity model that accurately describes the subterranean volume 110 (i.e., a single velocity of 2500 m/s). Panel 204 shows the migrated traces 202a-c for each of the three seismic detector depths. The migration operation in each detector depth has spread the reflection event out in an arc with a stationary phase. The bottom of each arc (i.e., the point of inflection or "stationary phase point") is tangent to the correct depth of interface 106, represented by horizontal line 206 at a depth of 2700 m. The stacked traces 208a-c for each of the seismic detector depths is shown in panel 210. When stacked, almost all of the energy of the stacked traces 208a-c are eliminated except for events 212a-c, each corresponding to the bottom point of the arcs of migrated traces 202a-c, respectively. Thus, the events 212a-c of the stacked traces 208a-c align at a depth of 2700 m. The enlarged partial view shown in panel 214 shows this alignment of events 212a-c.

However, when the data is migrated with the velocity that does not accurately describe the subterranean volume 110, a different behavior might be observed. For example, referring to panel 302 of FIG. 3, if the seismic traces are migrated with a velocity that is too slow (i.e., a single velocity of 2300 m/s), the migrated traces 304a-c are each too shallow (i.e., the stationary phase points occur at a shallower depth and are no longer tangent to horizontal line 206). Further, referring to panel 306, when these traces are stacked, the events 308a-c of each of the stacked traces 310a-c are not aligned. The enlarged partial view shown in panel 312 shows this misalignment of events 308a-c.

Figure 4:
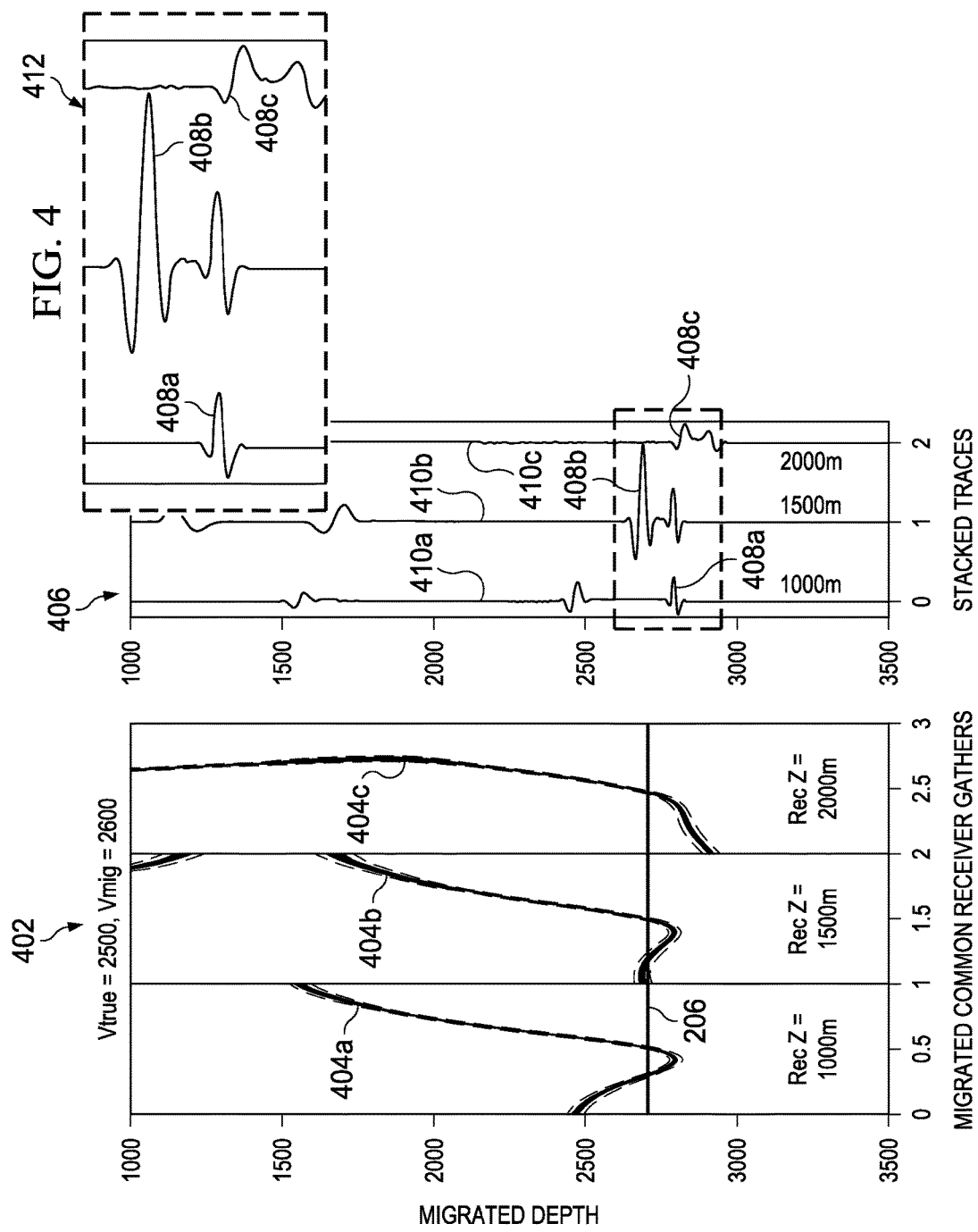
FIG. 4 shows an example migration using another inaccurate migration velocity.

If the data is instead migrated with a velocity that is too fast, another different behavior might be observed. For example, referring to panel 402 of FIG. 4, if the seismic traces are migrated with a velocity that is too fast (i.e., a single velocity of 2600 m/s), the migrated traces 404a-c are either too deep (i.e., the stationary phase points descend beyond the horizontal line 206), or the migrated traces 404a-c no longer align to result in arcs of stationary phase (e.g., in the case of migrated trace 404c). In addition, referring to panel 406, the events 408a-c of the stacked traces 410a-c become more complex and are not aligned. The enlarged partial view shown in panel 412 shows the increased complexity and misalignment of events 408a-c.

Accordingly, a variety of criteria can be used to ascertain whether the velocity used for migration is accurate. For instance, in some implementations, the accuracy of the migration velocity can be judged based on the degree to which the events of the stacked migrated traces align along a common depth (i.e., the "flatness" of the events). In an example, referring to panel 210 of FIG. 2, panel 306 of FIG. 3, and panel 406 in FIG. 4, the accuracy of each migration velocity can be ascertained based on the alignment of the events 212*a-c*, 308*a-c*, and 408*a-c* of migrated traces 208*a-c*, 310*a-c*, and 410*a-c*, respectively. If, for a given migration velocity, the events of a set of migrated traces are not aligned (i.e., not flat), then the velocity may be inaccurate.

In some implementations, the accuracy of the velocity used for migration can be judged based on the degree to which the stationary phases of the unstacked migrated traces align along a common depth (i.e., the "flatness" of the stationary phase points). For example, referring to panel 204 of FIG. 2, panel 302 of FIG. 3, and panel 402 in FIG. 4, the accuracy of each migration velocity can be ascertained based on the alignment of unstacked migrated traces 202*a-c*, 304*a-c*, and 402*a-c*, respectively. If, for a given migration velocity, the stationary phase points of a set of unstacked migrated traces are not aligned (i.e., not flat), then the velocity may be inaccurate.

In general, the alignment or "flatness" of a set of features (e.g., events or stationary phase points) can refer to the degree to which the stationary phase points of a set of traces align along a flat or horizontal line (i.e., a line that maintains the same depth across each of the traces). This may be determined by various techniques, for instance by measuring the variation in maximum value to minimum value of a fitting line connecting each of the features, counting the number of inflection changes in the fitting line, measuring the summed difference between the points on the fitting line and a straight line, or another such technique. Multiple techniques may be used alone or in combination to determine the alignment or flatness of stationary phase points for a set of traces.

In some implementations, the accuracy of the velocity used for migration can be judged based on the complexity of the stacked waveform. If the velocity is too fast, the stacked waveform may start to degrade. The degradation of a waveform can be determined, for instance by computing the semblance (or other such coherency measure) of the migrated traces (for example in boxes 210, 306, and 406) using different velocities. The semblance value will decrease significantly when the complexity increases and the alignment is poor.

In some implementations, the accuracy of the velocity used for migration can be judged based on the shape of the unstacked moveout curve for each common receiver gather migration. For example, referring to panel 204 of FIG. 2, panel 302 of FIG. 3, and Panel 402 in FIG. 4, the accuracy of the velocity used for migration can be ascertained based on the curvature of unstacked migrated traces 202*a-c*, 304*a-cm* and 404*a-c*, respectively. The curvature of these curves may change with the migration velocity. If the velocity is either slow or accurate the traces after migration can be concave upward. If the migration velocity is far faster than the true velocity (e.g., when the velocity is 40% too fast), the curvature may be concave downward. If the migration velocity is slightly faster than the true velocity (e.g., as in FIG. 4 where the velocity is 4% faster than the correct velocity), the curvature may be complex.

A single criterion or multiple criteria can be used to judge the accuracy of a velocity model. In addition, as each trace may vary in alignment, flatness, complexity, and/or shape in a continuous manner, each criterion need not result in a binary determination. As such, each velocity model may have varying degrees of accuracy, depending on how its properties compare to ideal reference cases. However, in some implementations, a binary determination can be made based on a particular threshold. As an example, in some implementations, a velocity model may be classified as inaccurate or accurate based on its degree of accuracy in relation to a particular degree of flatness, for instance a pre-determined flatness threshold.

Figure 5:
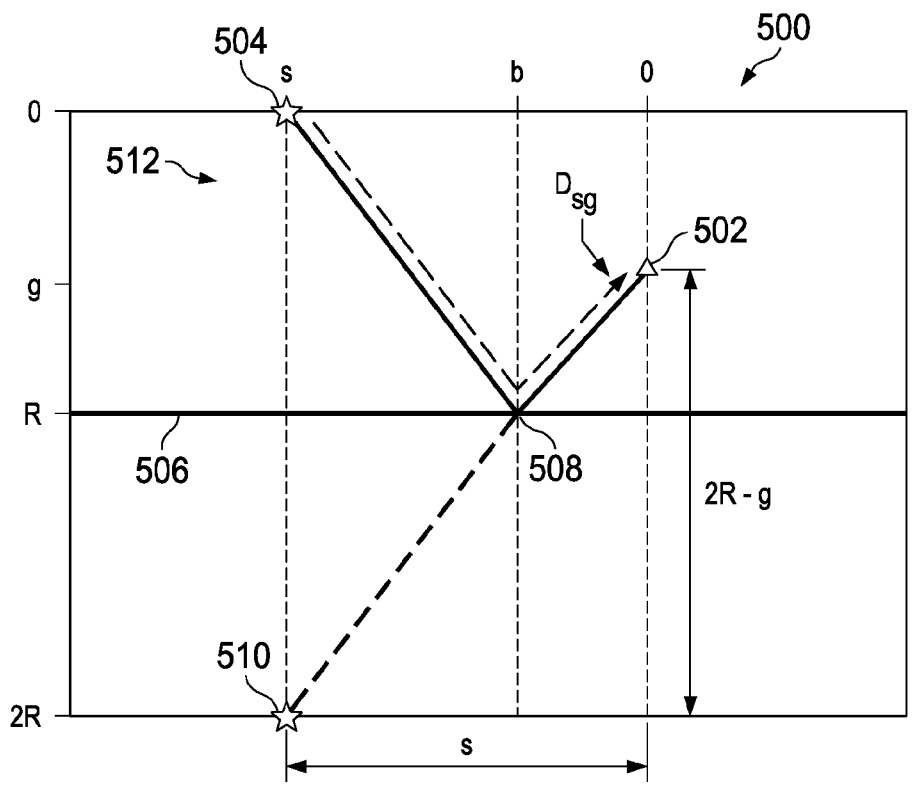
FIG. 5 is a diagram an example geometry of a single reflection model.

The above accuracy criteria can be used in conjunction with a variety of migration techniques. An example migration technique is described below for a generalized simple flat layer configuration. Referring to FIG. 5, a simple flat layer configuration 500 can be modeled as a single seismic detector 502 at a depth g, a single seismic source 504 on the surface at a horizontal distance S from receiver 502, and a single interface 506 at a depth R. A reflection point 508 on the interface 506 is positioned at a horizontal distance b from detector 502. A "mirror shot" 510, corresponding to the mirrored position of seismic source 504 relative to interface 506, is located at a depth 2R and at a horizontal distance s from detector 502. In this example configuration, the modeled distance from the seismic source 504 to the reflection point 508, and back to the detector 502, is given by $D_{sg}$, where:

$$D_{sg} = \sqrt{s^2 + (2R-g)^2} \quad (1).$$

The modeled travel time $t_{sg}$ is the distance $D_{sg}$, divided by the migration velocity $v_m$ of the layer 512:

$$t_{sg} = \frac{1}{v_m}\sqrt{s^2 + (2R-g)^2}. \quad (2)$$

Figure 6:
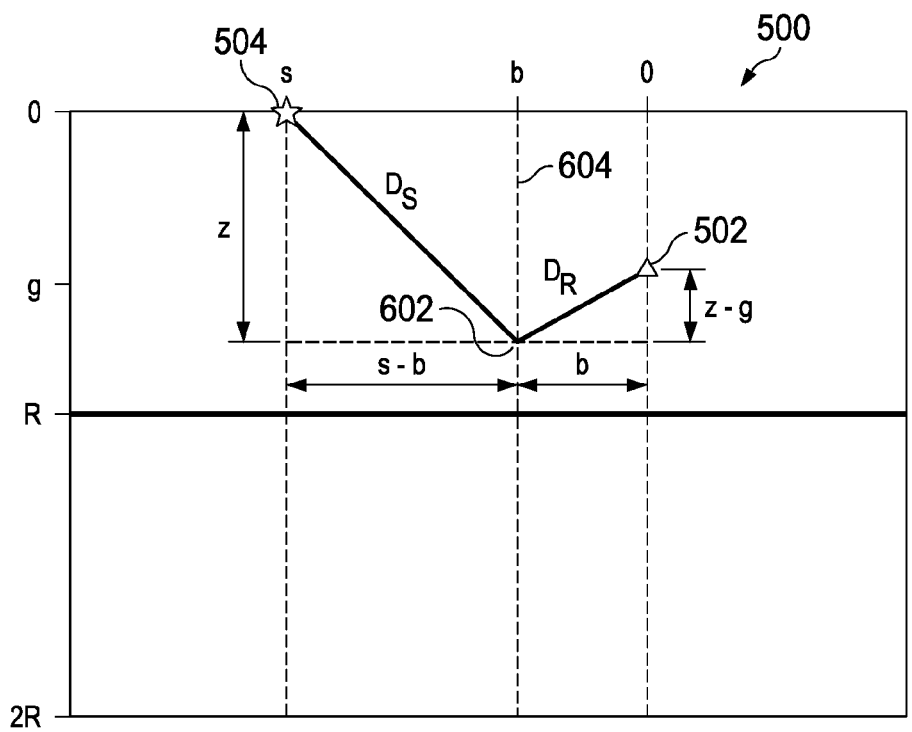
FIG. 6 shows an exemplary migration process for a single reflection model.

Referring to FIG. 6, for a migrated image point 602 in the example configuration 500, the distance $D_{si}$ between the seismic source 504 and the migrated image point 602 can be expressed as:

$$D_{si} = \sqrt{(s-b)^2 + z^2} \quad (3),$$

and the distance $D_{ri}$ between the migrated image point 602 and the receiver 502 can be expressed as:

$$D_{ri} = \sqrt{b^2 + (z-g)^2} \quad (4).$$

The travel time $t_{sig}$ is the sum of distances $D_{si}$ and $D_{ri}$, divided by the migration velocity $v_m$:

$$t_{sig} = \frac{D_{si} + D_{ri}}{v_m} = \frac{1}{v_m}\left(\sqrt{b^2 + (z-g)^2} + \sqrt{(s-b)^2 + z^2}\right). \quad (5)$$

The modeled travel time $t_{sg}$ can then be matched with the travel time $t_{sig}$ corresponding to the migrated image point:

$$\frac{1}{v_m}\sqrt{s^2 + (2R-g)^2} = \frac{1}{v_m}\left(\sqrt{b^2 + (z-g)^2} + \sqrt{(s-b)^2 + z^2}\right). \quad (6)$$

For each seismic source and receiver pair, there is only a single reflection, and a single corresponding modeled travel time $t_{sg}$. Thus, there will only be a contribution to the migrated image when the right hand side of the above equation (i.e., $t_{sig}$) equals the modeled travel time $t_{sg}$. Therefore, each reflection will appear as an ellipse on the resulting output image. When viewed from a single common image gather point (e.g., the common image gather point 604 located a horizontal distance b from receiver 502), this ellipse will contribute to one or two points for each migrated trace at the points where the ellipse and the common image gather point intersect.

The residual moveout for migrated unstacked traces can be described by the migration sweep of each reflection event as it crosses the common image gather under analysis (e.g., common image gather 604 at horizontal position b). This point of intersection is the image depth point, z, at the common image gather point, b. For each migration, the geometry parameters of the seismic source offset, s, detector depth, g, and migration velocity, $v_m$, are known. The left hand side of the above equation (i.e., modeled travel time $t_{sg}$) is the measured time of the reflected event. Thus, the stacked depth for a common receiver migration can be numerically solved by searching for the deepest z for that range.

Accordingly, during a migration and residual moveout analysis, an accurate migration velocity can be solved numerically, or through an iterative approach. In an example interactive approach, an accurate migration velocity can be determined by beginning with a slow trial migration velocity, and iteratively converging on an accurate velocity by gradually increasing the migration velocity. The accuracy of each migration velocity can be determined using one or more of the criteria described above.

In some implementations, a trial velocity model can be created that incorporates the known or estimated information on velocity, for example information obtained from well logs, surface seismic velocity methods, or conventional VSP arrival time processing. An iterative approach can then be used to "boot-strap" through each event in the VSP data.

Figure 7:
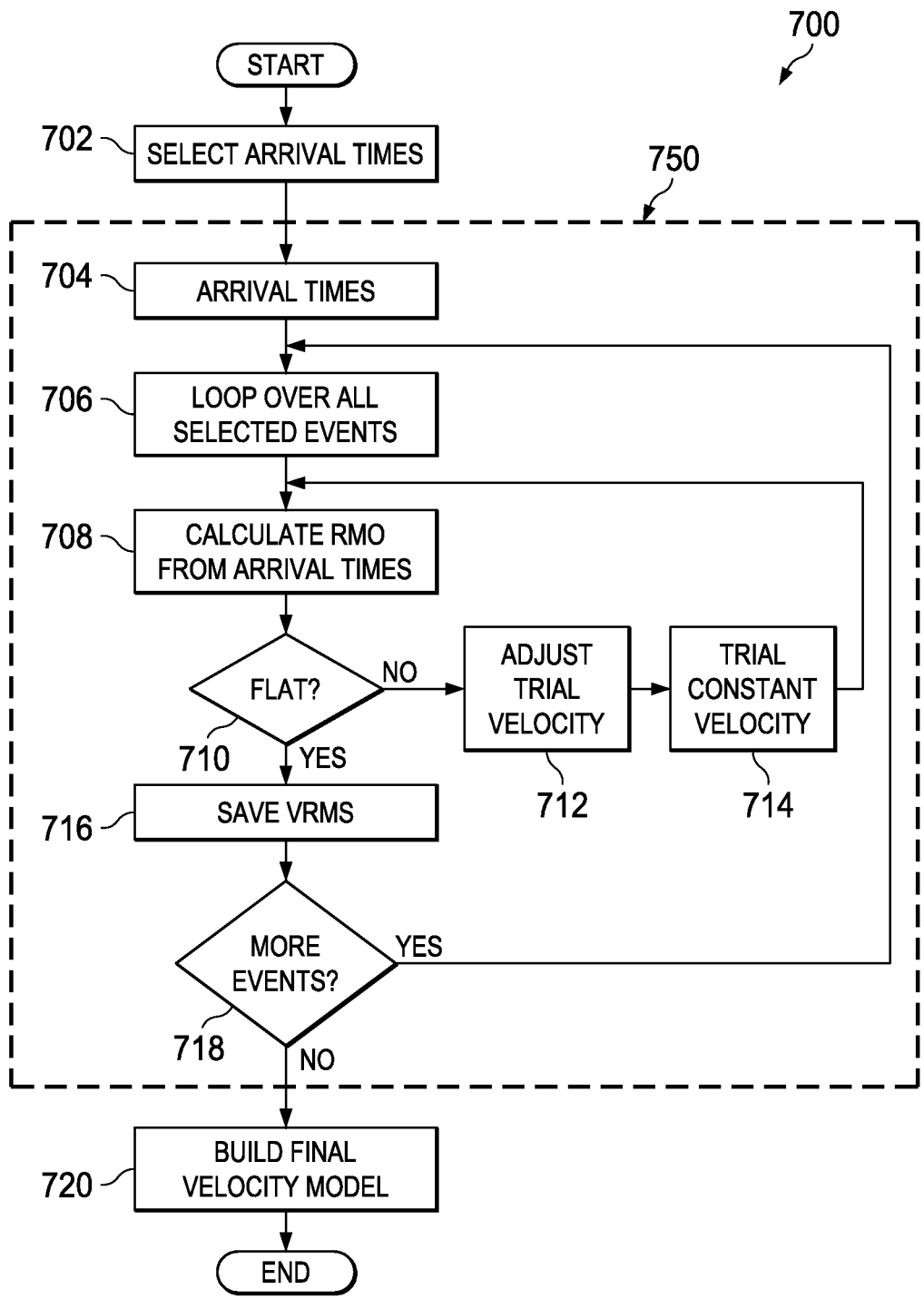
FIG. 7 is a flow chart an example velocity estimation process.

Referring to FIG. 7, an example of an iterative process 700 can be used to estimate the velocity for a set of events using simulated time migration. Process 700 begins by selecting a set of arrival times for a selection of reflection events in a data set (702). This set of arrival times can be selected by a user or automatically, for instance using a suitable event detection and/or tracking algorithm, such as given by: (Woodham, Sandham and Durrani, 1995, 3-D seismic tracking with probabilistic data association, Geophysics Vol 60, no 4), (Woodham, Sandham and Durrani, 1995, Error analysis for the seismic PDA tracker, Geophysics Vol 60, No 5), (Brown, A., 2012, The value of autotrackers, The Leading Edge). An analysis process (illustrated within the dotted box 750) is then looped over all of the selected events.

In the analysis process 750, for each event and its selected arrival times, a residual movement of the migrated events is predicted after a series of simulated common receiver migrations. A migration is "simulated" and is not actually performed, but the selected arrival times are combined with a trial migration velocity value in such a way as to find the stationary phase point in the migrated data, which predicts the depth at which the event will stack together in a migrated common receiver gather. This is performed for all common receiver gathers, and the result is a set of predicted migrated depths that would have been observed in a common image gather.

Analysis process 750 begins with the selected arrival times (704), and is looped over each of the selected events (706). For each event, the residual moveout (RMO) is calculated from the selected arrival times based on a trial migration velocity (708). RMO analysis can be performed, for example, as described above.

The accuracy of the trial migration velocity used during the RMO analysis can be determined based on one or more of the accuracy criteria described above. For example, the accuracy of the trial velocity can be determined based on the "flatness" of the unstacked migrated traces (710). If, as described previously, an inaccurate velocity value was used, then the depths will not be aligned and a correction needs to be made to the migration velocity. In this case, an adjustment is made to the trial migration velocity value (712), resulting in an updated trial velocity (714), and the RMO analysis process is repeated (708). The trial velocity may be adjusted in various ways. For instance, in some implementations, new trial velocities can be selected by scanning over a range of velocities (e.g., by beginning at one extreme of the range and gradually selecting slower or faster new trial velocities). In other approaches, more sophisticated methods can be used to search the solution space more efficiently.

As described previously, the degree to which unstacked migrated traces are flat is not a binary criterion. Thus, trial migration velocities may have varying degrees of accuracy, depending on how close its corresponding stationary points or events are to being perfectly co-incident. In some implementations, a trial migration velocity can be classified as accurate or inaccurate based on its degree of accuracy relative to a pre-determined degree of co-incidence.

If the unstacked migrated traces are flat, then the trial velocity is determined to be accurate, and the trial velocity is saved as the estimated root mean square velocity $v_{rms}$ of the model (716). This velocity $v_{rms}$ represents the root mean square (RMS) velocity of seismic energy from the seismic shot to the interface. The analysis process 750 can be repeated as necessary for each of the selected events (718).

After analysis of each of the selected events is complete, an interval velocity extraction can be performed from the set of saved velocities $v_{rms}$ to build a final velocity model (i.e., a field of velocity values describing the velocities of the examined region) (720).

While the above example uses the flatness of the unstacked migrated traces to ascertain the accuracy of a migration velocity, alternatively or additionally, other criteria can be used. For example, in some implementations, the accuracy of a migration velocity can be based on the flatness of events of the stacked migrated traces, the complexity of the stacked traces, the shape of the unstacked migrated traces, or other criteria, as described above.

This example process 700 can also be modified in various ways. For instance, in some implementations, process 700 can be modified to improve the velocity estimates, or to reduce the need for user interaction. In an example, the process may be modified as illustrated in process 800 of FIG. 8, to eliminate the need for a user to manually provide a set of arrival time selections for the reflection events in the data set. In addition, in modified process 800, an "actual" depth migration of the traces can be performed (instead of a "simulated" depth migration), and an "actual" residual moveout can be used after migration.

Example process 800 can be split into four parts: a) depth migration, b) arrival time inversion, c) RMS velocity estimation using simulated time migration, and d) computation of the interval velocities from the RMS velocities and update the velocity model.

a) The depth migration starts with a trial velocity model (i.e., a field of velocity values) (802) based upon known or estimated velocity information about the examined region. VSP data (804) is migrated with this trial model (806) and two volumes of data are saved. The migrated traces created from each CIG are saved into one data set, called migrated unstacked traces (808), an example of which is shown in panel 902 of FIG. 9. The number of traces in this data set will be ns*nr*nx, where ns is the number of seismic sources (i.e., "shots"), nr is the number of receivers (i.e., geophones), and nx is the number of output trace locations (i.e., common image gathers) along the image line. A second data set is created in which the traces from each migrated common receiver gather are stacked together (810), as shown in panel 904 of FIG. 9. So for this data set, the traces are stacked together over the shot dimension, giving nr*nx number of traces. Sorting these traces into common x locations, produces nx common image gathers, each which has nr number of traces.

As described above, the accuracy of the velocity model used during migration can be determined based on one or more of the accuracy criteria. As an example, the accuracy of the velocity model can be determined based on the "flatness" of the stationary phase points of the CIG traces (812). If, as described previously, the stationary phase points in each common image gather align (i.e., are "flat"), then velocity model is accurate. The velocity model is saved (814), and the process ends.

Figure 9:
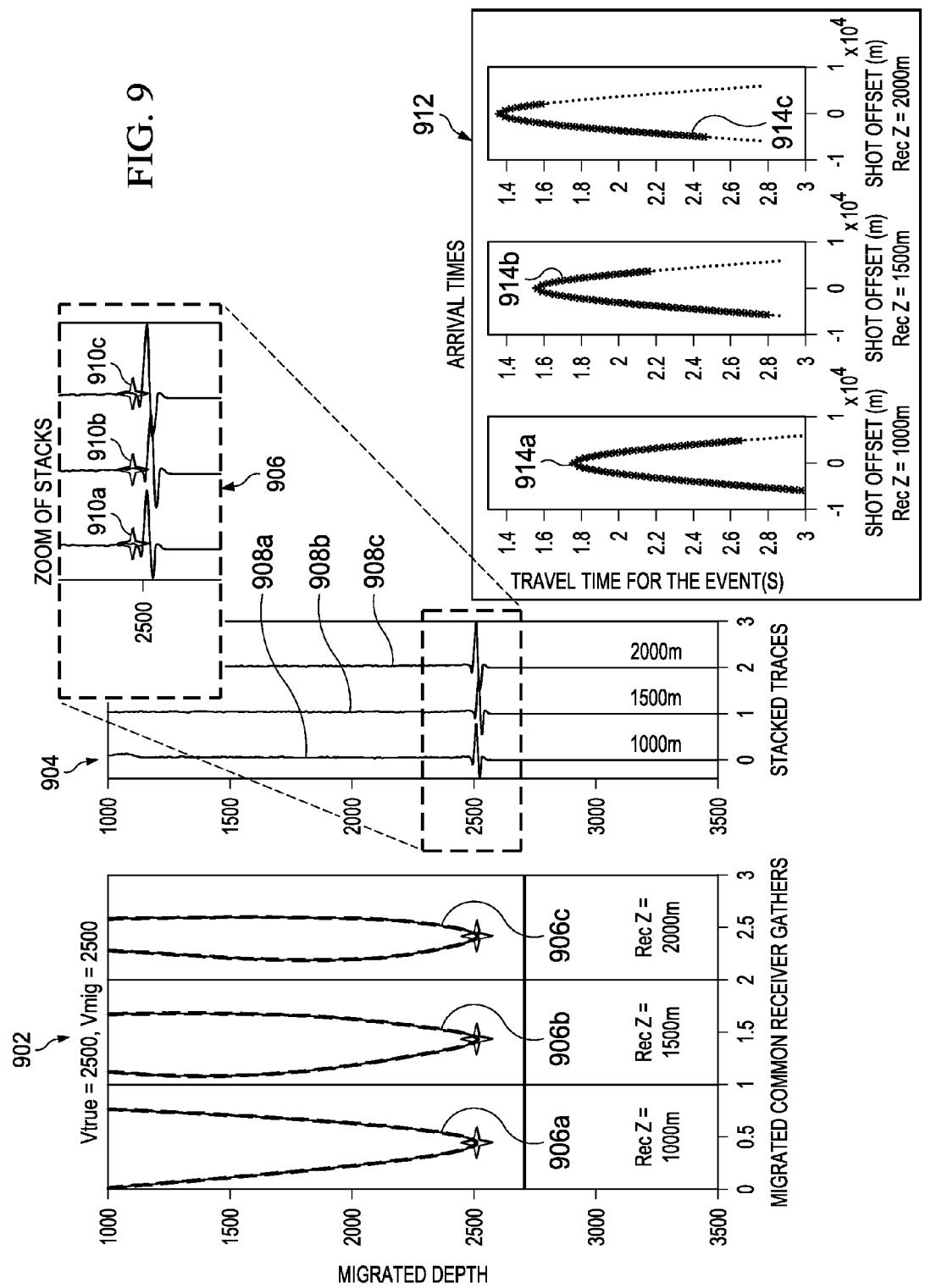
FIG. 9 shows example migrated unstacked data, stacked migrated traces, and inverted arrival times.

If an inaccurate migration velocity value was used, then the depths of the stationary phase points might not be aligned, and the residual moveout of one or more events on the common image gathers is digitized and selected (816). The residual moveout can be selected manually by a user, or automatically, for instance using a suitable event selection algorithm. As an example, event selection algorithms such as seismic event autotrackers can be used to select residual moveouts. FIG. 9 illustrates an example of migrated unstacked data 906a-c for three common receiver gathers (panel 902), stacked migrated traces 908a-c (where each trace 908a-c is a stacked migrated common receiver gather) (panel 904), and a zoom of the stacked traces 908a-c (panel 906). The markers 910a-c on the inset panel 906 shows the user digitized selections of the residual moveout. In an example implementation, for each event on the stacked traces in panel 906, the beginning of the event arrival times are digitized and recorded. The markers 910a-c show that the event is not flat across these traces. The user can manually digitize and record each of these arrival times which will be used for the residual moveout calculations. Alternatively, the user may digitize the arrival time for the event on one of the traces and an autotracker can be used to follow the event across all of the traces in panel 906. As an example, an autotracker can be implemented on a data processing device (e.g., control module 120 or other device used to process VSP data) in order to pick the arrival times. This selection process can be automated (e.g., performed with no input from the user), semi-automated (e.g., performed based partially on input from the user), or manually (e.g., performed based entirely on input from the user). Whatever the method used to pick the arrival times, an arrival time is picked for all of the stacked traces in panel 906, which is then used to compute the residual moveout.

b) Based on the RMO selections and the unstacked traces, arrival times are determined for each of the seismic traces through arrival time inversion (818). Panel 912 illustrates inverted arrival times 914a-c for each of the tracked seismic traces for the depths shown in panel 902. Referring to FIG. 9, in the arrival time inversion, the digitized depths of the events in the common image gathers (shown by stars 910a-c) are used to "seed" an analysis of the unstacked migrated traces (panel 902). The seed points from the migrated traces are mapped into the unstacked traces and used to auto-track the migrated event. That is, the seed points may be used to identify if an event is also captured on other traces. This may be performed in various ways, for instance by determining a degree of spatial or temporal similarity between events of two or more traces. In some implementations, instead of auto-tracking the migrated event, the user may selection each event manually. In this way, migrated depths are obtained for each event for all seismic sources and detectors.

Figure 8:
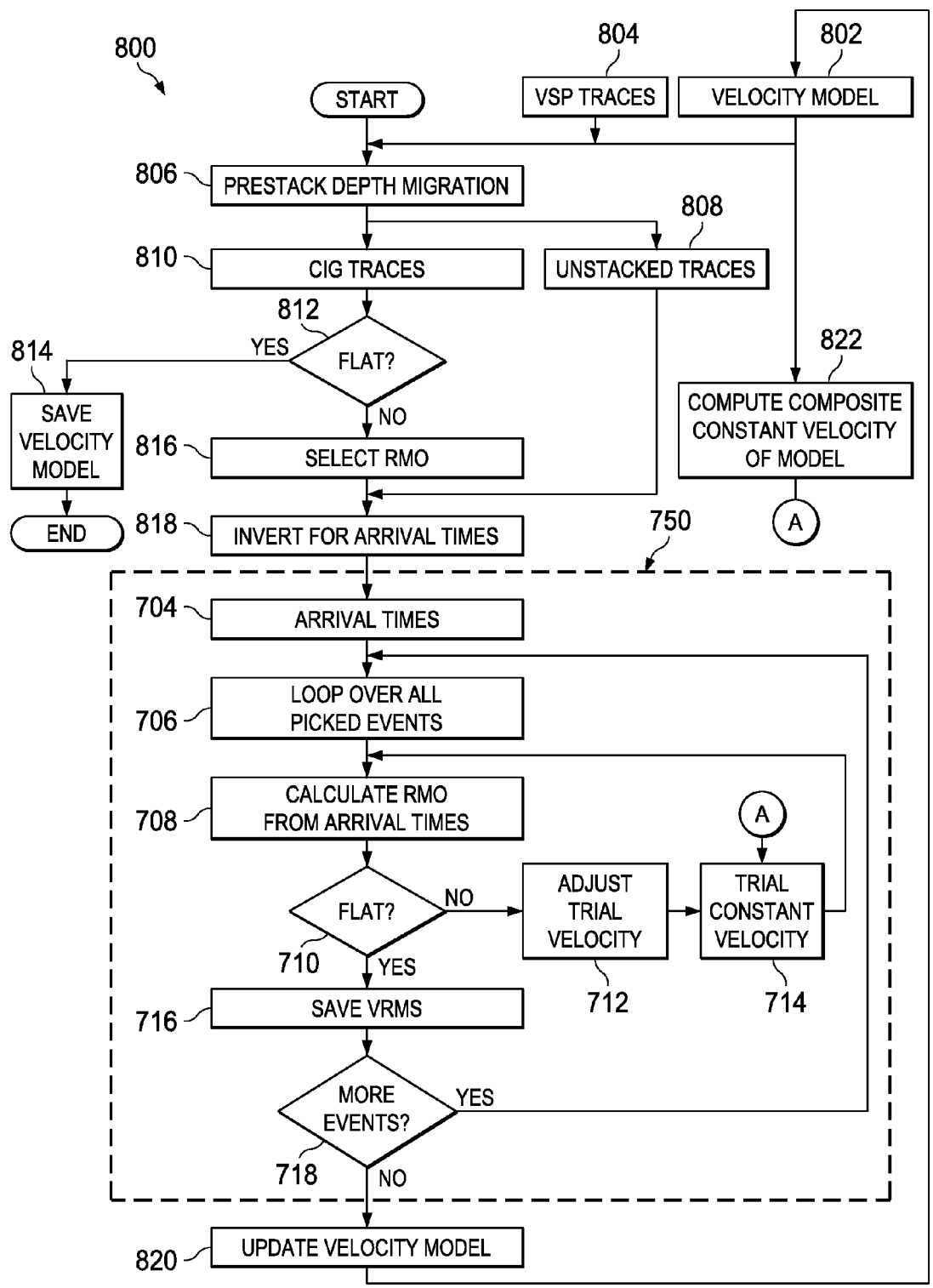
FIG. 8 is a flow chart of another example velocity estimation process.

These auto-tracked (or manually selected) depths are then inverted to find the arrival times of the events in the original unmigrated VSP traces, shown in panel 912. The inversion process is uses equation 17 below to solve for the arrival times. All of the variables are known in this equation except a. However, a can be found from the equation:

$$2a = V_{mig}T \qquad (7),$$

giving:

$$T = \frac{2a}{V_{mig}}, \qquad (8)$$

where T is the arrival time and $V_{mig}$ is the migration velocity. Therefore, the arrival time, T, can be found by numerically solving equation 17 for a, and then using the above equation to solve for T.

c) RMS velocity estimation can be performed based on the determined arrival times. For example, as shown in FIG. 8, RMO velocity estimation can be performed using a process similar to that shown within dotted box 750 in FIG. 7, using the inverted arrival times as an input.

d) Computation of the interval velocities from the RMS velocities can be performed on the collection of RMS velocities for each event found from the previous step c). A variety of methodologies can be used, for example the Dix velocity methodologies. The velocity model is updated from the newly estimated interval velocities (820). The updated velocity model (802) can be used to compute a composite constant velocity of the model (822) for use as future trial velocities, and can be used for subsequent depth migration for the remaining data.

The migration in step a) can then be repeated again and steps b), c), and d) can be followed through until the RMO of the migrated events are flat or have a degree of flatness that exceeds a particular criterion or threshold.

As before, while the above example uses the flatness of the unstacked migrated traces to ascertain the accuracy of a migration velocity, alternatively or additionally, other criteria can be used. For example, in some implementations, the accuracy of a migration velocity can be based on the flatness of events of the stacked migrated traces, the complexity of the stacked traces, the shape of the unstacked migrated traces, or other criteria, as described above.

Figure 10:
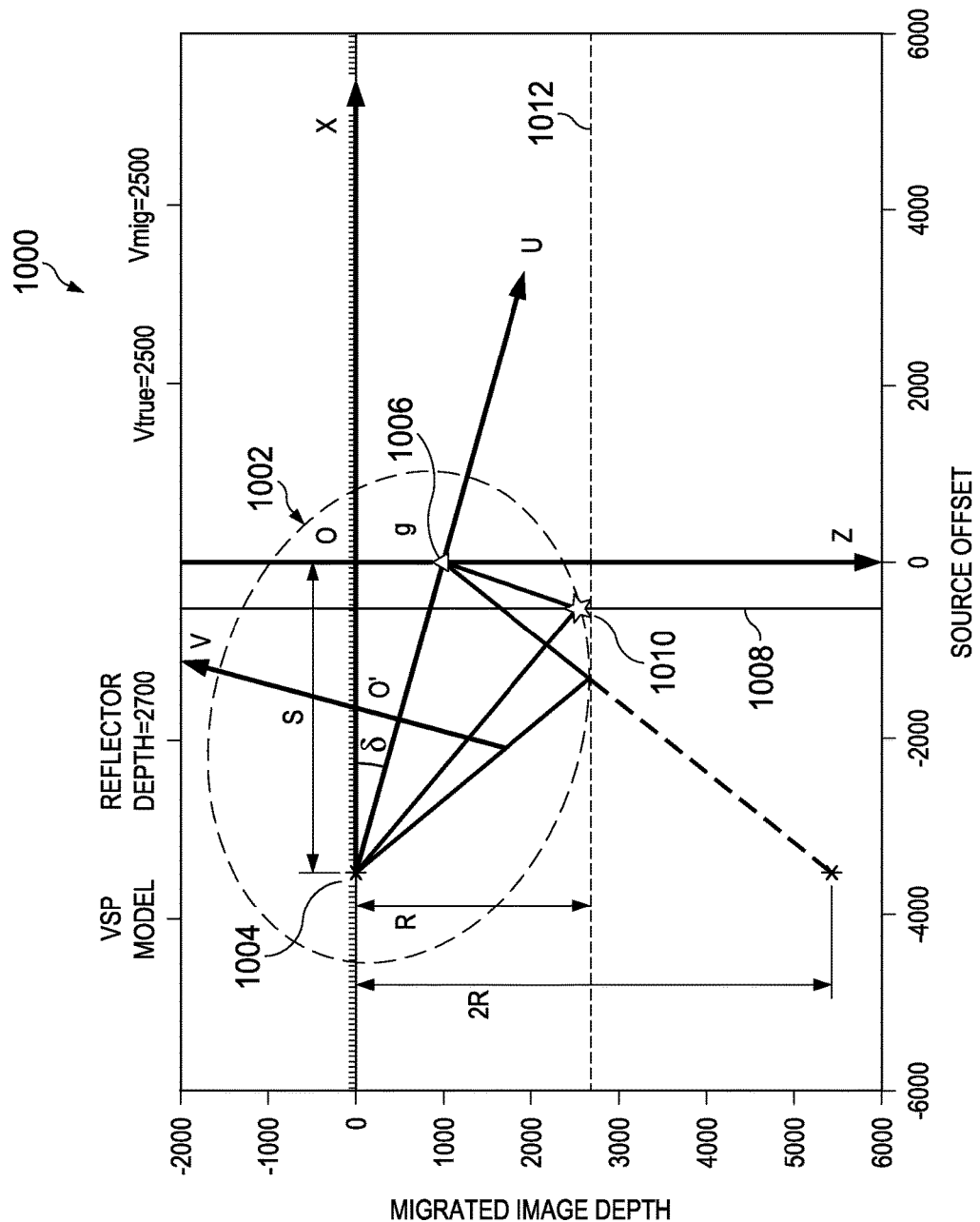
FIG. 10 is a diagram of an example two-dimension VSP migration ellipse.

In some embodiments, the migration process for a trace from a VSP data set can be described by a set of ellipses in the subsurface, along which each sample on a trace is swept out in the image. By determining the intersection of each ellipse with a CIG, the residual moveout for any migration velocity can be determined. For example, FIG. 10 shows an example VSP geometry 1000 with a seismic detector 1006 positioned at a depth of 1000 m, a seismic source 1004 positioned on the surface at a horizontal distance s from the detector 1006, and an interface 1012 positioned at a depth of 2700 m. An elliptical two-dimensional trajectory 1002 of a migration sweep can be obtained from a surface seismic source 1004 and seismic detector 1006. In this example, tilted ellipse 1002 represents a migration sweep for the true migration velocity (i.e., 2500 m/s), with its foci located at the seismic source 1004 and the seismic detector 1006. A CIG is located at the vertical line 1008, positioned 500 m horizontally from detector 1006, and a marker 1010 is shown at the intersection of the tilted ellipse 1002 and CIG 1008.

A series of two-dimensional equations may be used to describe each of the intersections of the migration sweep ellipses with the CIG. In some implementations, may be easier to solve for the intersection of a CIG and a single migration sweep ellipse if the coordinate system is changed from X (horizontal) and Z (depth), to one that follows the tilt of the ellipse. The coordinate system may change for each pair of source and receiver locations. In the new UO'V coordinates, as shown in FIG. 10 (where O' is the midpoint of the source and receiver), the tilted ellipse can be expressed by the equation 9:

$$\frac{u^2}{a^2} + \frac{v^2}{b^2} = 1, \tag{9}$$

in which u=a cos θ and v=b sin θ. The major axis, 2a, of the ellipse is constant if the migration velocity is chosen as:

$$2a = v_{mig} T \tag{10},$$

in which T is the computed time of the reflection events. Using the mirror source geometry, now $$T = \frac{\sqrt{(2R-g)^2 + s^2}}{v_{true}}. \tag{11}$$

The distance between the foci, 2c, of the ellipse is determined by the source offset, s, and receiver depth, g:

$$2c = \sqrt{s^2 + g^2} \tag{12}.$$

In this coordinate system, the common image gathers can be considered as lines given by:

$$v = ku + m \tag{13}.$$

The slope of the line, k, is defined by the pair of the source and receiver locations. The intercept, m, is related to the common image gather position, bb. These values are given by:

$$k = -\cot\delta = \frac{s}{g}, m = \frac{\frac{s}{2} - bb}{g}\sqrt{s^2 + g^2}. \tag{14}$$

Putting the line defined by Equation 13 into the ellipse defined by Equation 9 and using the quadratic formula, the intersection point (u, v) can be expressed as:

$$u = \frac{-kma^2 \pm ab\sqrt{-m^2 + b^2 + a^2k^2}}{b^2 + a^2k^2}, v = ku + m. \tag{15}$$

Since the intersection will be 2 points on the ellipse and the image point will only be the deeper one, only the '+' root for u can be selected. Therefore, after transferring back to the XOZ coordinates (where O is (0,0)), the intersection (x, z) will be:

$$x = u\cos\delta - v\sin\delta + \frac{2}{s} = bb, z = u\sin\delta + v\cos\delta + \frac{g}{2}. \tag{16}$$

Next, Equations 15 and 16 can be combined to yield the migration-intercept (MI) equation, which is the event depth in the unstacked, migrated traces in the original XOZ coordinates:

$$\frac{s(s-2bb)}{2g}(2a)^2 + \tag{17}$$

$$z = \frac{a\sqrt{(2a)^2 - (s^2 + g^2)}\sqrt{(2a)^2 - (s-2bb)^2 - g^2}}{(2a)^2 - g^2}.$$

By setting the derivative, δz/δs, of the equation 17 to zero, the extreme point for the equation is obtained. This will be the depth where the migrated traces stack in and the interface depth will be seen on this CIG trace. Each of these extreme points collapses the shot axis.

Thus from equation 17, the extreme point of a common of receiver gather migration can be estimated by scanning over all seismic sources, and finding where δz/δs is zero. This extreme point provides information about the depth at which this common receiver gather will produce a stacked, migrated event. By performing this operation for all of the receivers, the residual moveout for any migration velocity can be determined.

Figure 11:
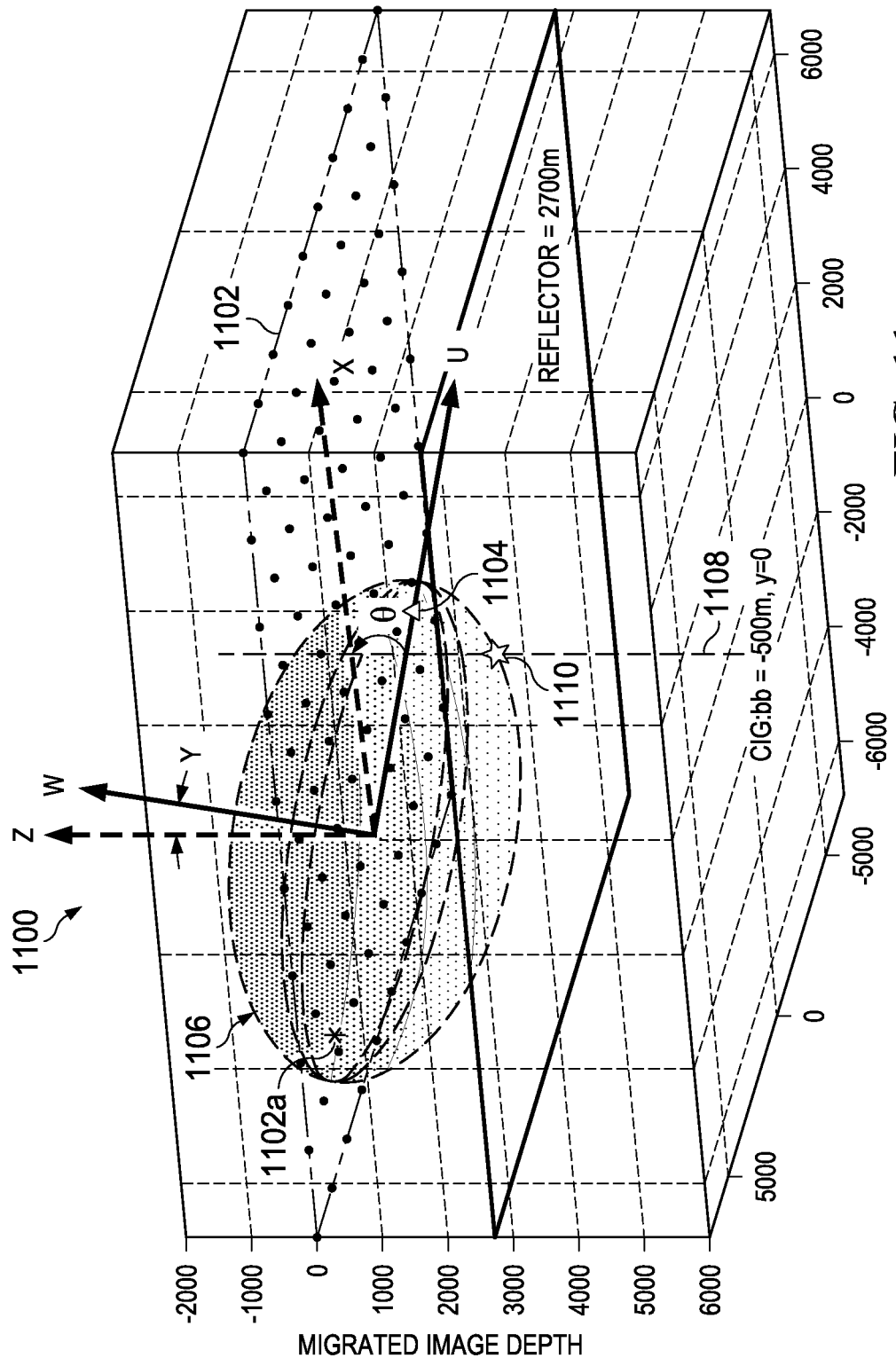
FIG. 11 is a diagram of an example three-dimensional VSP migration ellipsoid.

The derivation presented above is for a two-dimensional geometry, but the same process may be formed in three dimensions by performing a horizontal rotation on the coordinate system. For example, referring to FIG. 11, an example VSP geometry 1100 includes a seismic detector 1104 located at a depth of 1000 m, seismic sources 1102 located along the surface, an a interface located at a depth of 2700 m. An example of a tilted ellipsoid 1106 is given with the foci at a seismic source 1102a and detector 1104 for the true velocity (i.e., 2500 m/s). The CIG is located at the vertical line 1108, positioned 500 m horizontally from detector 1104, and a marker 1110 is shown at the intersection of the tilted ellipsoid 1106 and CIG 1108.

The two-dimensional solutions described above can be extended to three dimensions. An ellipsoidal three-dimensional trajectory of the migration sweep for a migration of a single sample on the traces is given by:

$$\frac{u^2}{a^2} + \frac{v^2}{a^2} + \frac{w^2}{b^2} = 1. \tag{18}$$

2a is still the major axis of the ellipsoid, which is constant if the migration velocity is chosen as:

$$2a = v_{mig} T.$$

The distance between the foci, 2c, of the ellipsoid is determined by the source offset in x direction sx, the source offset in y direction sy, and receiver depth, g:

$$2c = \sqrt{sx^2 + sy^2 + g^2} \tag{19}.$$

If we define source offset as $$s = \sqrt{sx^2 + sy^2} \tag{20},$$

the foci will be the same format as the 2D case:

$$2c = \sqrt{s^2 + g^2} \tag{21}.$$

In UVW coordinate system, the common image gathers can be also considered as line functions:

$$w = ku + m \tag{22}.$$

k and m keep the same format with the 2D case:

$$k = -\cot\delta = \frac{s}{g}, m = \frac{\frac{s}{2} - bb^*}{g}\sqrt{s^2 + g^2}, \quad (23)$$

where $$bb^* = bb * \sin\theta = bb\frac{sx}{s}, \quad (24)$$

and where θ is the angle between U axis and X axis in the UX plane, and tan θ=sy/sx. Putting the line defined by Equation 22) into the ellipsoid defined by Equation 18 and using the quadratic formula, the intersection point (u, v, w) can be expressed as:

$$u = \frac{-kma^2 \pm b\sqrt{-m^2a^2 - b^2v^2 - a^2k^2v^2 + a^4k^2 + a^2b^2}}{b^2 + a^2k^2} \quad (25)$$

where v=bb*tan θ.

Transferring back to XYZ coordinates:

$$z = u\sin\gamma - w\cos\gamma + \frac{g}{2} \quad (26)$$

where γ is the angle between W axis and Z axis in the UW plane and tan $$\gamma = \frac{g}{s}$$

From equations 23, 25, and 26, we can obtain the final expression for the intersection point depth (we only select the '+' root):

$$z = u/\sin\gamma - m*\cos\gamma + \frac{g}{2} \quad (27)$$

$$= \frac{-kma^2 + b\sqrt{\begin{array}{c}-m^2a^2 - b^2(bb\cot\theta)^2 - \\ a^2k^2(bb\cot\theta)^2 + a^4k^2 + a^2b^2\end{array}}}{(b^2 + a^2k^2)/\sin\gamma} -$$

$$\left(\frac{s}{2} - bb\sin\theta\right)\cot\gamma + \frac{g}{2}.$$

In the two-dimensional case, we solved for the extreme point by setting the derivative, δz/δs, to zero. However, for the three-dimensional case, we can search through all of the seismic sources to find the extreme value of z, in equation 27. This will be the depth where the migrated traces stack in and the interface depth will be seen on this CIG trace. By performing this operation for all of the receivers, the residual moveout for any migration velocity can be determined.

Figure 12:
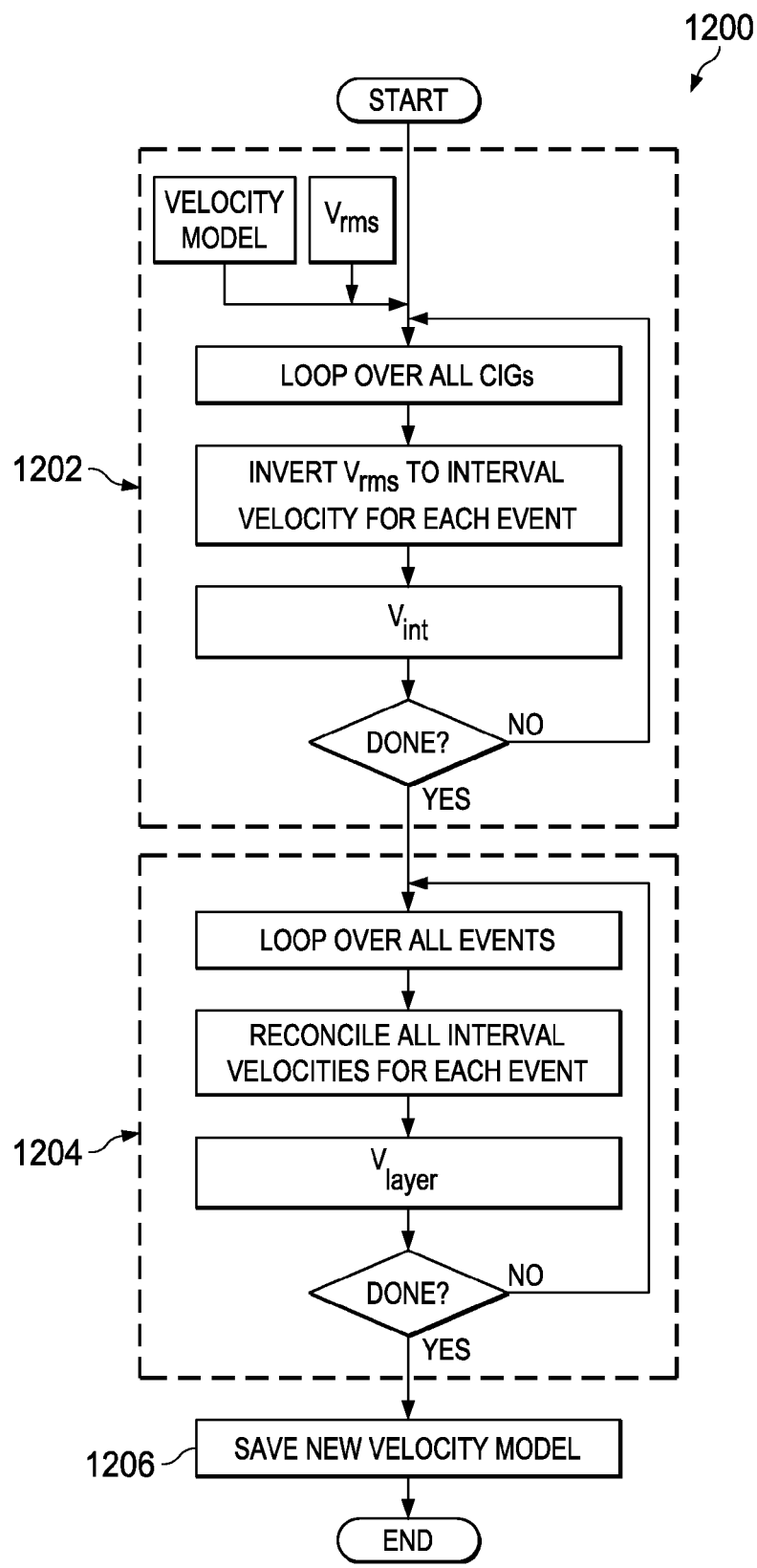
FIG. 12 is a flowchart of an example velocity updating process.

A number of embodiments of the invention have been described. Nevertheless, it will be understood that other implementations are also possible. For example, the velocity model updating step 820 of FIG. 8 may be used to convert individual $v_{rms}$ values for each event in each CIG into interval layer velocities for each layer in the updated model. Referring to FIG. 12, in an example process 1200, for each CIG, the $v_{rms}$ can be inverted using the velocity model to obtain the interval velocity $v_{int}$ for each event, and each $v_{int}$ from each event can be mapped into a single layer in the velocity model (block 1202). These mapped interval velocities from all of the CIGs are then reconciled for each layer to obtain the layer velocity model $v_{layer}$ (block 1204). That is, for each layer in the model there will be multiple estimates of the interval velocity which varies over the width or lateral span of the model. In an example implementation, the simple average of these multiple velocity estimates can be used as the layer velocity. In another implementation, a lateral linear trend (in both dimensions x and y) can be derived and used as the velocity function for the layer. In another implementation, a piecewise smoothly varying function (in both dimensions x and y) can be constructed from these multiple velocity estimates. Standard methods such as least squares curve fitting with polynomials or spline functions can be used as it commonly practiced in the industry. This new updated velocity model $v_{layer}$ is saved as the new velocity model (block 1206).

While the aforementioned techniques have been described the context of conventional VSP techniques (i.e., where the seismic energy is generated on the surface and the detectors are in a wellbore), these techniques may also be applicable to a reverse VSP (i.e., where the seismic energy is generated in the wellbore and the detectors are on the surface). In the case of reverse VSP, common receiver gathers become common shot gathers, and so forth.

The techniques described above can be implemented in digital electronic circuitry, or in computer software, firmware, or hardware, including the structures disclosed in this specification and their structural equivalents, or in combinations of one or more of them. For example, control module 120 can include an electronic processor that can be used to control systems for generating energy from seismic sources and measuring data from seismic detectors. In another example, an electronic processor can be used to analyze and process data during VSP analysis, for instance to estimate the velocity of a collection of reflection events, as described above.

The term "electronic processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Various aspects of the invention may be summarized as follows.

In general, in an aspect, a method of processing vertical seismic profile data using depth migration includes obtaining vertical seismic profile data for each of at least two geophones, migrating the vertical seismic profile data of each geophone using a first velocity model to produce migrated data for each geophone, stacking the migrated data of each geophone to produce a stacked migrated trace having one or more events for each geophone. The method also includes determining a degree of accuracy of the first velocity model based on at least one of the following characteristics: a flatness of each event in the migrated traces, a complexity of each event in the migrated traces, a curvature of each event in the migrated traces, and an alignment of peak amplitudes of the events in the migrated traces. The method also includes selecting a second velocity model based the degree of accuracy of the first velocity model.

Implementations of this aspect may include one or more of the following features:

In some implementations, a velocity model that results in flatter events in the migrated traces can have a higher degree of accuracy than a velocity model that results in events in the migrated trace that are less flat. A velocity model that results in less complex events in the migrated traces can have a higher degree of accuracy than a velocity model that results in more complex events in the migrated trace. A velocity model that results in events in the migrated traces with a curvature that is concave upward can correspond to a velocity model that is either too slow or is accurate. A velocity model that results in events in the migrated traces with a curvature that is concave downward can correspond to a velocity model that is too fast. A velocity model that results in events in the migrated traces with complex curvature can correspond to a velocity model that is too fast. A velocity model that results in events in the migrated traces with aligned peak amplitudes can correspond to an accurate velocity model.

In general, in another aspect, a method of processing vertical seismic profile data using simulated time migration includes obtaining vertical seismic profile data for each of at least two different geophones, determining data related to a residual moveout based on one or more arrival time values and a first trial velocity value, determining a degree of accuracy of the first trial velocity value, selecting a second trial velocity value based on the degree of accuracy of the first velocity model, and determining an interval velocity based on the second trial velocity value.

Implementations of this aspect may include one or more of the following features:

In some implementations, the method also includes iteratively determining the degree of accuracy of the second trial velocity value. The first trial velocity value can be a user selected value. The first trial velocity value can be based on pre-determined information about the vertical seismic profile data. Determining a degree of accuracy can include determining one or more stationary phase points corresponding to the vertical seismic profile data migrated by the first velocity model. The stationary phase points can correspond to a depth prediction. The degree of accuracy can be determined based of a similarity between two or more stationary phase points. The one or more stationary phase points can be determined based on a point of intersection between a boundary of a migration sweep and a line corresponding to a common image gather location. The boundary of the migration sweep can be an ellipse. The boundary of the migration sweep can be an ellipsoid.

In general, in another aspect, a method of processing vertical seismic profile data includes obtaining vertical seismic profile data for each of at least two geophones, and performing a depth migration. Performing a depth migration includes migrating the vertical seismic profile data of each geophone using a velocity model to produce migrated data for each geophone, stacking the migrated data of each geophone to produce a stacked migrated trace having one or more events for each geophone, and determining a first degree of accuracy of the velocity model based on at least one of the following characteristics: a flatness of each event in the migrated traces, a complexity of each event in the migrated traces, a curvature of each event in the migrated traces, and an alignment of peak amplitudes of the events in the migrated traces. Performing depth migration also includes selecting at least a portion of the vertical seismic profile data based on the degree of accuracy determination. The method also includes performing a simulated time migration. Simulated time migration includes determining data related to a residual moveout corresponding to the portion of the vertical seismic profile data, based on one or more arrival time values and a first trial velocity value, determining a second degree of accuracy of the first trial velocity value, selecting a second trial velocity value based on the second degree of accuracy of the first velocity value, determining an interval velocity based on the second trial velocity value, and updating the velocity model based on the second trial velocity value. The method also includes repeating the depth migration and the simulated time migration until the first degree of accuracy exceeds a pre-determined value.

Implementations of this aspect may include one or more of the following features:

In some implementations, the method also includes iteratively determining the degree of accuracy of the second trial velocity value. The arrival time value can correspond to the portion of the vertical seismic profile data. Determining the second degree of accuracy can include determining one or more stationary phase points corresponding to the vertical seismic profile data migrated by the first velocity value. The stationary phase points can correspond to a depth prediction. The second degree of accuracy can be determined based of a similarity between two or more stationary phase points. The one or more stationary phase points can be determined based on a point of intersection between a trajectory of a migration sweep and a line corresponding to a common image gather location. The trajectory of the migration sweep can be an ellipse. The trajectory of the migration sweep can be an ellipsoid.

In general, in another aspect, a system includes at least one seismic source for directing seismic energy towards a subterranean region during operation of the system, at least two geophones each for obtaining vertical seismic profile data during operation of the system, and a control module programmed to implement a method described above.

Implementations of this aspect may include one or more of the following features:

In some implementations, the at least one seismic source can be disposed on a surface of the subterranean region. The at least one seismic source can be disposed beneath a surface of the subterranean region. The geophones can be disposed beneath a surface of the subterranean region. The geophones can be disposed within a wellbore defined in the subterranean region. The geophones can be disposed on a surface of the subterranean region.

Other embodiments are in the following claims.

What is claimed is:

1. A method of processing vertical seismic profile data comprising:
   obtaining vertical seismic profile data for each of at least two geophones;
   performing a depth migration to image the vertical seismic profile data, comprising:
      migrating the vertical seismic profile data of each geophone using a velocity model to produce migrated data for each geophone;
      stacking the migrated data of each geophone to produce a stacked migrated trace having one or more events for each geophone;
      determining a first degree of accuracy of the velocity model based on at least one of the following characteristics:
         a flatness of each event in the migrated traces,
         a complexity of each event in the migrated traces, a curvature of each event in the migrated traces, and
         an alignment of peak amplitudes of the events in the migrated traces; and
      selecting at least a portion of the vertical seismic profile data based on the degree of accuracy determination;
   performing a simulated time migration to estimate velocity updates, comprising:
      deteanining data related to a residual moveout corresponding to the portion of the vertical seismic profile data, based on one or more arrival time values and a first trial velocity value;
      detemiining a second degree of accuracy of the first trial velocity value;
      selecting a second trial velocity value based on the second degree of accuracy of the first velocity value;
      determining an interval velocity based on the second trial velocity value; and
      updating the velocity model based on the second trial velocity value; and
   repeating the depth migration and the simulated time migration until the first degree of accuracy exceeds a pre-determined value wherein the method is performed by a control module and the velocity model is used to create an accurate image of a subsurface reservoir proximate to a wellbore during drilling or operation of a well.

2. The method of claim 1, further comprising iteratively determining the degree of accuracy of the second trial velocity value.

3. The method of claim 1, wherein the arrival time value corresponds to the portion of the vertical seismic profile data.

4. The method of claim 1, wherein determining the second degree of accuracy comprises determining one or more stationary phase points corresponding to the vertical seismic profile data migrated by the first velocity value.

5. The method of claim 4, wherein the stationary phase points correspond to a depth prediction.

6. The method of claim 5, wherein the second degree of accuracy is determined based on a similarity between two or more stationary phase points.

7. The method of claim 6, wherein the one or more stationary phase points are determined based on a point of intersection between a trajectory of a migration sweep and a line corresponding to a common image gather location.

8. The method of claim 7, wherein the trajectory of the migration sweep in two spatial dimensions is an ellipse.

9. The method of claim 7, wherein the trajectory of the migration sweep in three spatial dimensions is an ellipsoid.

10. The method of claim 1, wherein the first trial velocity value is a user selected value.

11. The method of claim 1, wherein the first trial velocity value is based on pre-determined information about the vertical seismic profile data.

12. A system comprising:
   at least one seismic source for directing seismic energy towards a subterranean region during operation of the system;
   at least two geophones each for obtaining vertical seismic profile data during operation of the system; and
   a control module programmed to:
      perform a depth migration to image the vertical seismic profile data, comprising:
         migrating the vertical seismic profile data of each geophone using a velocity model to produce migrated data for each geophone;
         stacking the migrated data of each geophone to produce a stacked migrated trace having one or more events for each geophone;
         determining a first degree of accuracy of the velocity model based on at least one of the following characteristics:
            a flatness of each event in the migrated traces,
            a complexity of each event in the migrated traces,
            a curvature of each event in the migrated traces, and
            an alignment of peak amplitudes of the events in the migrated traces; and
         selecting at least a portion of the vertical seismic profile data based on the degree of accuracy estimation;
      perform a simulated time migration to estimate velocity updates, comprising:
         determining data related to a residual moveout corresponding to the portion of the vertical seismic profile data, based on one or more arrival time values and a first trial velocity value;
         determining a second degree of accuracy of the first trial velocity value;
         selecting a second trial velocity value based on the second degree of accuracy of the first velocity value;
         determining an interval velocity based on the second trial velocity value; and
         updating the velocity model based on the second trial velocity value; and repeating the depth migration and simulated time migration until the first degree of accuracy exceeds a pre-determined value wherein the velocity model is used to create an accurate image of a subsurface reservoir proximate to a wellbore during drilling or operation of a well.

13. The system of claim 12, wherein the at least one seismic source is disposed on a surface of the subterranean region.

14. The system of claim 12, wherein the at least one seismic source is disposed beneath a surface of the subterranean region.

15. The system of claim 12, wherein the geophones are disposed beneath a surface of the subterranean region.

16. The system of claim 15, wherein the geophones are disposed within a wellbore defined in the subterranean region.

17. The system of claim 12, where the geophones are disposed on a surface of the subterranean region.

* * * * *

UNITED STATES PATENT AND TRADEMARK OFFICE
CERTIFICATE OF CORRECTION

PATENT NO. : 9,804,281 B2  Page 1 of 1
APPLICATION NO. : 14/651909
DATED : October 31, 2017
INVENTOR(S) : Mark E. Willis et al.

It is certified that error appears in the above-identified patent and that said Letters Patent is hereby corrected as shown below:

In the Specification

Figure 3:
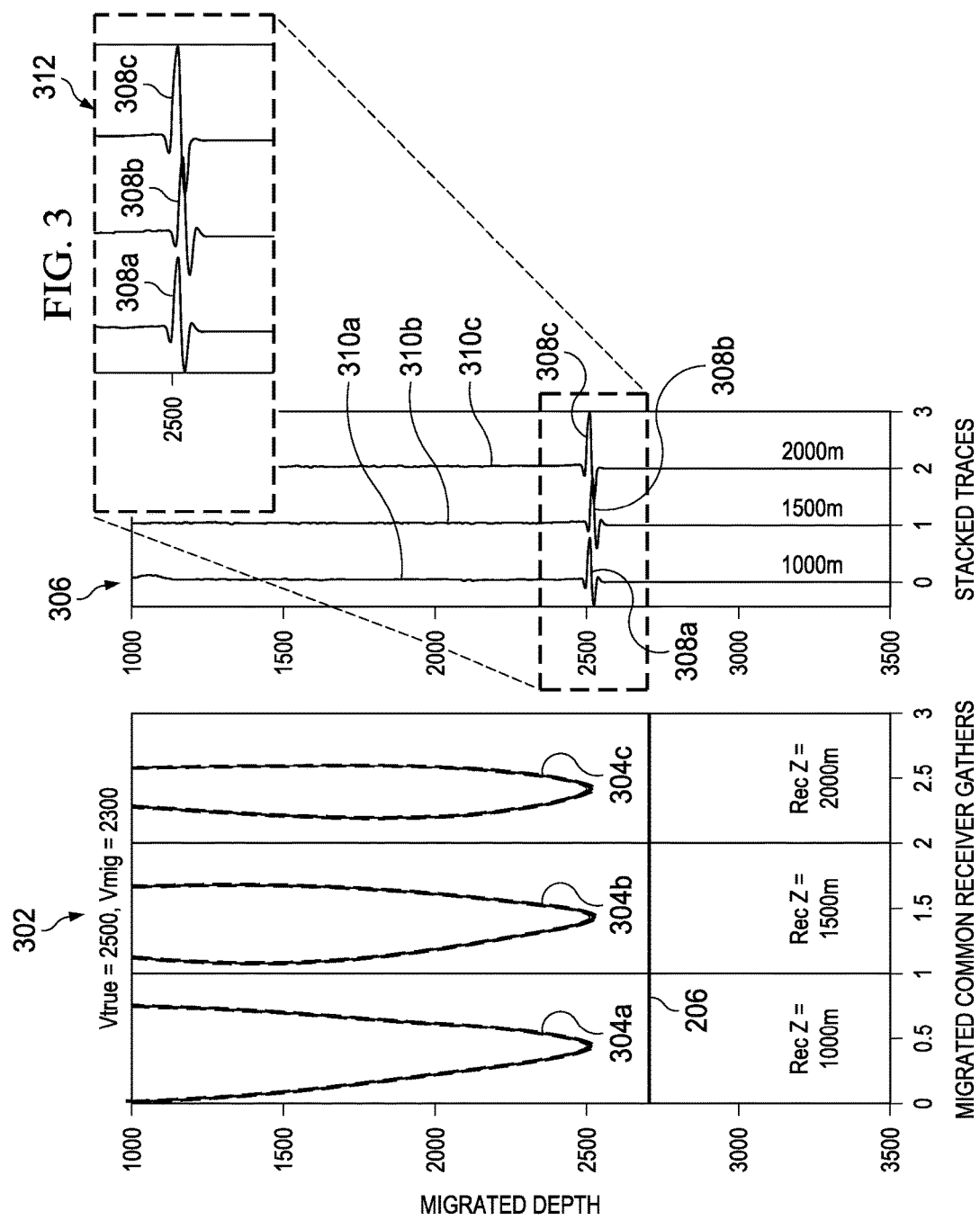
FIG. 3 shows an example migration using an inaccurate migration velocity.

In Column 5, Line 49, after "FIG. 3, and" delete "Panel" and please insert --panel--

In Column 5, Lines 51 and 52, after "202a-c," delete "304a-cm" and please insert --304a-c,--

Signed and Sealed this
Twentieth Day of February, 2018

Andrei Iancu
*Director of the United States Patent and Trademark Office*